United States Patent Office 2,853,465
Patented Sept. 23, 1958

2,853,465

POLYVINYL HALIDE RESIN COMPOSITIONS CONTAINING N-VINYLPYRROLIDONE POLYMERS AND PROCESS OF SIZING GLASS THEREWITH

Jesse Werner, Holliswood, N. Y., assignor to General Aniline & Film Corporation, New York, N. Y., a corporation of Delaware No Drawing. Application June 16, 1955
Serial No. 516,031

12 Claims. (Cl. 260—45.5)

The present invention relates to polyvinyl halide resins and particularly to modified compositions of polyvinyl halides containing a polymer or copolymer of N-vinyl pyrrolidone.

Polyvinyl halides have little if any adhesion to glass. Polyvinyl halide films, although having many desirable properties, such as smoothness, pliability, low-cost, etc., have extremely poor tear resistance. These two drawbacks have prevented the use of polyvinyl halides for laminating purposes and have limited their use in the automotive and apparel fields.

Two separate approaches to the solution of this problem have been tried without success. The first was to modify the polyvinyl halide by copolymerizing it with other polymerizable monomers. This has proved ineffectual. The second approach was to pretreat the glass to give it adhesion for the polyvinyl halide resin. Finishes of this type consist of methacrylatochromic chloride and vinyl trichloro-silane. In the former type the inorganic portion of the molecule attaches itself to the glass surface, leaving the unsaturated portion of the molecule to take part in further reactions, such as cross-linking. This is inapplicable to polyvinyl halide resins as they are saturated and are not set by cross-linking. In the latter type, the trichlorosilane portion, after hydrolysis, attaches itself to the glass surface, leaving the unsaturated vinyl group to take part in the cross-linking reaction. Again, this is inapplicable to the saturated polyvinyl halide resins.

It is an object of this invention to overcome the foregoing difficulties and to provide a new modified polyvinyl halide composition having the unexpected property of possessing excellent adhesion to various types of glass materials, while still maintaining excellent water insensitivity.

Another object is to provide processes for preparing compositions of a polyvinyl halide resin modified with a polymer of N-vinyl pyrrolidone and glass material, such as fibers, strands, mats, cloth, flakes, and other glass materials.

Other objects and advantages will become more clearly apparent from the following specification.

I have found that polyvinyl halide resins may be successfully modified so as to obtain excellent glass adhesion by employing a mixture of a polyvinyl halide and a polymer of N-vinyl pyrrolidone. By employing a mixture containing from 80 to 97% of a polyvinyl halide and from 20 to 3% of a polymer of N-vinyl pyrrolidone, which term includes homopolymers of vinyl pyrrolidone and copolymers with other polymerizable monomers, a composition is obtained having extremely high adhesion to all glass surfaces. Such a composition may not only be used as a laminating agent between two sheets or mats of glass, but may be used by itself as an unsupported film with glass included in its composition as a reinforcing agent. Its use as a laminating agent yields excellent structural compositions, which also have the advantage of an inexpensive polyvinyl halide resin. The inclusion of glass into the modified polyvinyl halide composition results in films that are still smooth and pliable, and also have excellent tear resistance. Despite the fact that the modified polyvinyl halide composition may contain as much as 20% of an N-vinyl pyrrolidone homo or copolymer, the resulting laminates and films, even after prolonged water immersion, display tenacious adhesion to glass, and with no apprent leaching.

The modified polyvinyl halide composition of the present invention, containing from 80 to 97% of a polyvinyl halide resin such as polyvinyl chloride, polyvinyl bromide, polyvinyl fluoride, and copolymers of vinyl halides with other polymerizable monomers, and from 20 to 3% of a homo- or copolymer of N-vinyl pyrrolidone, are prepared in several ways, depending upon its use as a laminating agent, or as a reinforced, unsupported film.

When used as a laminating agent the polyvinyl halide and the homo- or copolymer of N-vinyl pyrrolidone are dissolved in a solvent or combination of solvents in which both components are soluble. Such solvents are legion, and well known to those skilled in the art, and no difficulty will be encountered in selecting the proper solvent or mixtures thereof to effect solution of the components constituting the mixture. As illustrative examples of such solvents, the following may be mentioned:

Methyl pyrrolidone
2-pyrrolidone
Tetrahydrofuran and ethyl alcohol
Methyl ethyl ketone and ethyl alcohol
Dimethyl formamide and ethyl alcohol The solution is then coated on the glass sheets or glass mats or other glass materials, and the laminates thus prepared are heated under pressure until all the solvent or solvent mixture has evaporated.

More flexible laminates can also be prepared by coating the glass material with the modified polyhalide composition in the form of a plastisol or an organosol composition. Plastisols are a special type of dispersion in which a plasticizer is added in sufficient proportion to be the sole dispersing medium and the coatings so prepared have no volatile constituents. It is to be noted that although the homo- or copolymers of N-vinyl pyrrolidone are not soluble in the plasticizer, even at the fixing temperature of the polyvinyl halide, they are still an integral part of the final product, and impart excellent glass adhesion to the composition. An organosol is essentially the same as a plastisol, except that it contains a diluent or diluents, which are volatilized off during the lamination.

Another method that may be used to prepare laminates is to press alternate layers of glass cloth with dry vinyl halide powder, the powdered polymer of N-vinyl pyrrolidone in the aforestated ratios.

The modified polyvinyl halide composition of the present invention, when employed as a reinforced unsupported film is prepared by adding glass flakes, glass fibers, glass strands, etc., to the modified composition in the form of a plastisol or organosol, and then baking or fusing at the proper temperature and pressure.

The homopolymers of N-vinyl pryyrolidone which may be employed in admixture with the polyvinyl halide are characterized by the following general formula:

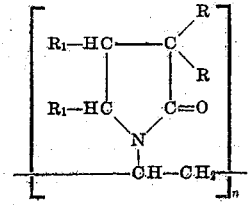

wherein R and $R_1$ represent either hydrozen, methyl or ethyl groups, and $n$ represents a number indicative of the extent of polymerization. The number of recurring homopolymer units indicated by "$n$" usually corresponds to a chain of 192 to 980 monomer units.

As illustrations of the above homopolymers, the following may be mentioned:

N-vinyl-2-pyrrolidone
5-methyl-N-vinyl-2-pyrrolidone
5-ethyl-N-vinyl-2-pyrrolidone
3,3-dimethyl-N-vinyl-2-pyrrolidone
3-methyl-N-vinyl-2-pyrrolidone
4-methyl-N-vinyl-2-pyrrolidone
4-ethyl-N-vinyl-2-pyrrolidone All of the homopolymers of N-vinyl pyrrolidone characterized by the foregoing general formula are commercially available, and are readily prepared by the procedural steps given in U.S.P. 2,265,450; 2,317,804 and 2,335,454, in which working examples of all the species characterized by the above formula are given.

The copolymers of N-vinyl pyrrolidone with other polymerizable monomers include:

Vinyl pyrrolidone—vinyl acetate
Vinyl pyrrolidone—maleic anhydride
Vinyl pyrrolidone—diallyl phthalate
Vinyl pyrrolidone—acrylonitrile All of the aforementioned copolymers are readily prepared by following the methods given in the literature. The only restriction imposed upon such copolymers is that the vinyl pyrrolidone content be at least 50%.

The following examples will illustrate the various ways in which the modified polyvinyl halides of the present inventions are prepared and employed.

*Example I*

Ten grams of polyvinyl chloride resin were dissolved in 100 cc. of tetrahydrofuran, and the resulting solution was coated on twenty sheets of 2 by 2 glass cloth, so that the final resin to glass ratio was about 40 to 60. The sheets were then placed one upon another, put into a Carver press, and heated for six minutes at a temperature of 110-130° C. and a pressure of 4,000 p. s. i. The resulting laminate had little if any adhesion between glass sheets, and could be pulled apart with little or no pressure.

*Example II*

Ten grams of polyvinyl chloride resin were dissolved in 100 cc. of tetrahydrofuran and to this was added 0.5 grams of N-vinyl-2-pyrrolidone polymer dissolved in 5 cc. of ethanol. The resulting solution was coated on twenty layers of 2 by 2 glass cloth to give a resin to glass ratio of about 40 to 60. The glass sheets were then stacked and placed in a Carver press for six minutes at 110-130° C. and 4,000 p. s. i. The resulting laminate had excellent adhesion and could not be delaminated manually. It was also very resistant to delamination on bending and twisting.

*Example III*

To a Waring Blendor 60 grams of polyvinyl chloride resin and 40 grams of dioctyl phthalate were added and the mixture spinned until homogeneous. Ten layers of 2 by 2 glass cloth were coated so that plastisol-glass ratio was about 40 to 60. The coatings were stacked in layers and placed in a Carver press for three minutes at 165° C. and 4,000 p. s. i. The resulting laminate had little if any adhesion and the layers could be pulled apart very easily.

*Example IV*

To a Waring Blendor 60 grams of polyvinyl bromide resin, 40 grams of dioctyl phthalate, and 6 grams of 3-methyl-N-vinyl-2-pyrrolidone polymer were added and the mixture of 6 grams spinned until homogeneous. The layers of 2 by 2 glass cloth were coated, stacked and placed in a Carver press at 165° C. for three minutes at 4,000 p. s. i. The resulting laminate, although more pliable than that produced in Example II, had excellent adhesion and could not be delaminated manually.

*Example V*

Fiberglas mat pads were pulled apart carefully to permit a molding powder to penetrate more easily. These mats were then tumbled with polyvinyl chloride molding powder until it was uniformly distributed throughout the mat. The ratio of polyvinyl chloride resin to glass was approximately 80 to 20. The impregnated glass mat was transferred to a matched metal die and pressed for ten minutes at 350° F. and 640 p. s. i. pressure. The mold was then cooled to room temperature and the resulting laminate had a heat distortion point (ASTM D648–45T) of 54° C., and a tensile strength (ASTM D638–52T) of 9,800 p. s. i.

*Example VI*

Example V was repeated with the exception that 10% by weight of N-vinyl-2-pyrrolidone polymer was added to the polyvinyl chloride molding powder. The resulting laminate had a heat distortion point (ASTM D648–45T) of 68° C., and a tensile strength (ASTM D638–52T) of 12,310 p. s. i.

*Example VII*

To a Waring Blendor 60 grams of polyvinyl chloride resin and 40.0 grams of dioctylphthalate were added and the mixture spinned until homogeneous. It was then poured onto a stainless steel plate in a thin layer and heated at 350° F. for four minutes at atmospheric pressure. The resulting mat was smooth, pliable, rubbery, and had excellent resiliency, but when cut, ripped easily.

*Example VIII*

To a Waring Blendor, 60.0 grams of polyvinyl chloride resin nad 40.0 grams of dioctylphthalate, and 4.0 grams of glass fibers (approximately one-half inch length), were added and the mixture spinned until a homogeneous mass obtained. The mass was poured in a thin layer on a stainless steel plate and heated at 350° F. for four minutes. The resulting sheet was not smooth, for the glass was not even dispersed, but rather in lumps, and much of it protruded from the surface of the film like bristles. When cut, the film ripped easily, except for those occasional spots where there was a heavy concentration of glass fibers.

*Example IX*

To a Waring Blendor, 60.0 grams of polyvinyl chloride resin, 40.0 grams of dioctylphthalate, 6.0 grams of 4-methyl-N-vinyl-2-pyrrolidone polymer, and 4.0 grams chopped glass fiber (approximately one-half inch long) were added and the mixture spinned until homogeneous. The mass was poured in a thin layer on a stainless steel plate and heated for four minutes at 350° F. The resulting sheet was smooth, pliant, but no longer very rubbery. It had good stretch resistance. The glass fibers were not visible, they were evenly dispersed with no local concentration buildups, and with no fibers protruding from the film surface. When cut, the film was not easily ripped, because of the glass reinforcing.

*Example X*

Example IX was repeated exactly except that 2.0 grams Titanox A–168 LO white pigment was added to the mixture. The resulting film was identical with that obtained in Example IX, except that it was pigmented white and no longer translucent but opaque. Unless cut, it was not possible to see any of the glass fibers present.

Example XI

To a Waring Blendor, 60.0 grams of polyvinyl chloride resin, 30.0 grams of dioctylphthalate, 25.0 grams of xylene were added and the mixture spinned until homogeneous. The homogeneous mixture was poured in a thin layer on a stainless steel plate and heated at 350° F. for six minutes. The resulting film was similar to that obtained in Example VII, except that it had some air bubbles present. It was smooth, pliable, transparent, and easily ripped.

Example XII

To a Waring Blendor, 60.0 grams of polyvinyl chloride resin, 30.0 grams of dioctylphthalate, 25.0 grams of xylene and 2.0 grams of chopped one-half inch glass fibers were added and the mixture spinned until homogeneous. It was poured in a thin layer on a stainless steel plate and heated at 350° F. for six minutes. The resulting film was similar to that obtained in Example VIII.

Example XIII

To a Waring Blendor, 60.0 grams of polyvinyl chloride resin, 30.0 grams of Flexol DOP (di-2-ethylhexyl phthalate), 25.0 grams of xylene, 2.0 grams of chopped one-half inch glass fibers and 6.0 grams of 3,3-dimethyl-N-vinyl-2-pyrrolidone polymer were added and the mixture spinned until homogeneous. It was then poured in a thin layer on a stainless steel plate and heated at 350° F. for six minutes. The resulting film was similar to that obtained in Example IX. The fiber was evenly distributed within the film, and the film, once cut, was not easily ripped.

Example XIV

Example XIII was repeated exactly, except that 2.0 grams Titanox A-168 LO pigment and 0.25 gram phthalocyanine blue pigment were added. The resulting blue pigment film was smooth with no visible fibers, and could not be easily ripped, once cut.

Example XV

To a Waring Blendor, 60.0 grams of polyvinyl fluoride resin, 60.0 grams of dioctylphthalate and 6.0 grams of 5-methyl-N-vinyl-2-pyrrolidone polymer were added and the mixture spinned until homogeneous. To 10 grams of the mass, 10 grams of glass flakes were added and the mass mixed until the glass flakes were evenly coated. The coating was spread between two 6 by 6 inch stainless steel plates and baked in a Carver press for three minutes at 1,000 p. s. i. and 325° F. The resulting mat is white, flexible, continuous, with no free glass flakes visible. The mat has excellent electrical insulating properties and retains its water insensitivity.

It should be noted that the plastisol and organosol compositions may be prepared by other known methods, such as grinding or using a rollermill. The baking or fusing steps may also be carried out in other apparatus at reduced pressure or at above atmospheric pressures.

I claim:

1. A composition of matter adaptable for sizing glass surfaces comprising a mixture containing 80–97% of a homopolymer of a vinyl halide and 3–20% of a polymer of N-vinyl pyrrolidone having the following general formula

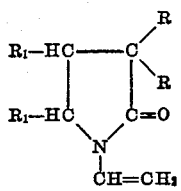

wherein R and $R_1$ represent a member selected from the class consisting of hydrogen, methyl and ethyl groups, the said polymer containing a minimum of 50% of said N-vinyl pyrrolidone.

2. A composition of matter according to claim 1 wherein the N-vinyl pyrrolidone is N-vinyl-2-pyrrolidone.

3. A composition of matter according to claim 1 wherein the N-vinyl pyrrolidone is 3-methyl-N-vinyl-2-pyrrolidone.

4. A composition of matter according to claim 1 wherein the N-vinyl pyrrolidone is 3,3-dimethyl-N-vinyl-2-pyrrolidone.

5. A composition of matter according to claim 1 wherein the N-vinyl pyrrolidone is 4-methyl-N-vinyl-2-pyrrolidone.

6. A composition of matter according to claim 1 wherein the N-vinyl pyrrolidone is 5-methyl-N-vinyl-2-pyrrolidone.

7. The process of sizing a glass surface which comprises applying thereto a composition comprising a mixture containing 80–97% of a homopolymer of a vinyl halide and 3–20% of a polymer of N-vinyl pyrrolidone having the following general formula:

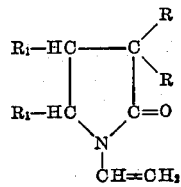

wherein R and $R_1$ represent a member selected from the class consisting of hydrogen, methyl and ethyl groups, said polymer containing a minimum of 50% of said N-vinyl pyrrolidone.

8. The process according to claim 7 wherein the N-vinyl pyrrolidone is N-vinyl-2-pyrrolidone.

9. The process according to claim 7 wherein the N-vinyl pyrrolidone is 3-methyl-N-vinyl-2-pyrrolidone.

10. The process according to claim 7 wherein the N-vinyl pyrrolidone is 3,3-dimethyl-N-vinyl-2-pyrrolidone.

11. The process according to claim 7 wherein the N-vinyl pyrrolidone is 4-methyl-N-vinyl-2-pyrrolidone.

12. The process according to claim 7 wherein the N-vinyl pyrrolidone is 5-methyl-N-vinyl-2-pyrrolidone.

References Cited in the file of this patent

UNITED STATES PATENTS

| | | |
|---|---|---|
| 2,144,067 | Kranzlein | Jan. 17, 1939 |
| 2,790,783 | Coover | Apr. 30, 1957 |

FOREIGN PATENTS

| | | |
|---|---|---|
| 801,746 | Germany | Jan. 22, 1951 |

OTHER REFERENCES

Schildknecht: "Vinyl and Related Polymers," pub. by John Wiley & Sons, Inc., New York (1952), page 678.